(12) United States Patent
Marche

(10) Patent No.: US 8,540,186 B2
(45) Date of Patent: Sep. 24, 2013

(54) RIGID AIRCRAFT PYLON STRUCTURE IN CONTACT WITH A FUSELAGE LATERAL EXTENSION FOR ATTACHMENT

(75) Inventor: Jacques Hervé Marche, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 219 days.

(21) Appl. No.: 13/131,950

(22) PCT Filed: Nov. 30, 2009

(86) PCT No.: PCT/FR2009/052332
§ 371 (c)(1),
(2), (4) Date: Aug. 30, 2011

(87) PCT Pub. No.: WO2010/063926
PCT Pub. Date: Jun. 10, 2010

(65) Prior Publication Data
US 2011/0309188 A1   Dec. 22, 2011

(30) Foreign Application Priority Data
Dec. 1, 2008 (FR) ..................... 08 58168

(51) Int. Cl.
*B64D 27/00* (2006.01)
(52) U.S. Cl.
USPC ................ 244/54; 60/796; 60/797; 248/554; 248/557

(58) Field of Classification Search
USPC ..... 244/54, 55, 53 R; 60/796–797; 248/554, 248/557
See application file for complete search history.

(56) References Cited

U.S. PATENT DOCUMENTS

| | | | | |
|---|---|---|---|---|
| 2,863,620 | A * | 12/1958 | Vautier | 244/15 |
| 3,487,888 | A * | 1/1970 | Bennett, Jr. et al. | 181/207 |
| 3,490,556 | A * | 1/1970 | Bennett, Jr. et al. | 181/207 |
| 4,821,980 | A * | 4/1989 | Clausen et al. | 244/54 |
| 4,854,525 | A * | 8/1989 | Chee | 244/54 |
| 5,064,144 | A * | 11/1991 | Chee | 244/54 |
| 5,065,959 | A * | 11/1991 | Bhatia et al. | 244/54 |
| 5,443,229 | A * | 8/1995 | O'Brien et al. | 244/54 |
| 5,873,559 | A * | 2/1999 | von Flotow et al. | 248/557 |
| 7,726,602 | B2 * | 6/2010 | Llamas Sandin | 244/54 |
| 2007/0246603 | A1 * | 10/2007 | Udall et al. | 244/54 |
| 2009/0090811 | A1 * | 4/2009 | Llamas Sandin | 244/54 |

FOREIGN PATENT DOCUMENTS

| EP | 0 311 155 A2 | 4/1989 |
|---|---|---|
| EP | 0 311 155 A3 | 4/1989 |

* cited by examiner

*Primary Examiner* — Philip J Bonzell
(74) *Attorney, Agent, or Firm* — Oblon, Spivak, McClelland, Maier & Neustadt, L.L.P.

(57) ABSTRACT

An aft part of an aircraft, including at least one engine assembly including a turbine engine and a turbine engine mounting pylon. A rigid structure of the mounting pylon includes a longitudinal central box and a connection box carried by the box and projecting from the box. The aircraft structure includes a fuselage lateral extension projecting from it, and the connection box is pressed into contact with the fuselage extension, below it, an attachment mechanism being arranged between these two entities.

10 Claims, 6 Drawing Sheets

RIGID AIRCRAFT PYLON STRUCTURE IN CONTACT WITH A FUSELAGE LATERAL EXTENSION FOR ATTACHMENT

This invention relates in general to an aft part of an aircraft comprising at least one engine assembly, particularly of the type designed to be installed at the side of the fuselage of this aircraft.

In this field, there is a need for simplification of the attachment between the engine assembly and the structure of the aircraft used as a support for this engine assembly.

To satisfy this need, the first purpose of the invention is an aft part of an aircraft comprising at least one engine assembly including a turbine engine and a turbine engine mounting pylon, said engine assembly being added onto the side of the aircraft structure, said pylon comprising a rigid structure offset radially from a longitudinal axis of the turbine engine along one direction of separation, the pylon also comprising first attachment means for assembly of the turbine engine on the rigid structure and second attachment means fixed firstly to said rigid assembly and secondly to the aircraft structure. According to the invention, the rigid structure comprises a longitudinal central box and a connection box carried by said central longitudinal box and projecting from it along a first direction of the line of separation from the turbine engine towards the rigid structure. Furthermore, said aircraft structure comprises a fuselage lateral extension projecting from the fuselage in a second direction along the line of separation, opposite said first direction. Finally, one of the two entities among said lateral extension of the fuselage and said connection box is pressed into contact with the other entity, below it, said second attachment means being arranged between these two entities.

The result of this innovative design is a significant simplification of the attachment between the engine assembly and the aircraft structure acting as a support for this engine assembly. The engine assembly can be easily moved such that its connection box comes into contact with the fuselage lateral extension, preferably by simply lifting this engine assembly, the second attachment means can then be easily arranged between these two entities to fix them to each other.

In this respect, if the two cases are considered, the preferred case is the case in which the connection box is pressed in contact below the lateral extension of the fuselage, which very much simplifies lifting of the engine assembly. All that is necessary in this case is to lift the engine assembly vertically only, without encountering any particular hindrance, until the required contact is obtained with the lower part of the fuselage lateral extension. For example, this can be done using a lifting tool mounted directly on the fuselage extension.

Preferably, said fuselage lateral extension comprises a plurality of first ribs, said connection box comprises a plurality of second ribs and at least one of said first ribs is laid out in the continuity of one of said second ribs, approximately in the same plane. This not only facilitates the transfer of forces from the engine assembly to the aircraft structure, but it also makes it easy to assemble second attachment means, which can easily be fitted on these ribs. Preferably, all first and second ribs are located continuous with each other, in pairs, and preferably in parallel planes. Thus, it is preferred that at least part of second attachment means should be fixed on said first and second ribs.

According to a first preferred embodiment of this invention, said second attachment means form a statically determinate attachment system of the engine assembly onto the aircraft structure. In this case, said second attachment means are preferably composed of a plurality of mounts each including a rod resisting forces. Each rod is then arranged in the direction along which the mount concerned is to resist forces.

According to a second preferred embodiment of this invention, said second attachment means form a statically indeterminate system for attachment of the engine assembly onto the aircraft structure. In this other case, said second attachment means are preferably composed of a plurality of soft mounts each including a shock absorbing element made of rubber or elastomer.

Preferably, each first rib of said fuselage lateral extension is made in a single piece with a fuselage frame, even if alternately these first ribs could be added onto the fuselage frames, without going outside the scope of the invention.

Preferably, the central longitudinal box at least partly supports said first attachment means. Furthermore, said connection box supporting at least part of said second attachment means is shorter than the central longitudinal box along the longitudinal direction of the turbine engine.

In a known manner, the engine assembly arranged laterally relative to the fuselage behind the main wing is not necessarily arranged such that the said direction of separation is parallel to or coincident with a horizontal median plane of the aircraft, this horizontal median plane of the aircraft may be at an angle from said spacing direction.

Another purpose of the invention relates to an aircraft comprising an aft part like that presented above.

Finally, another purpose of the invention is a method of assembling an aft part of an aircraft as described above, comprising lifting of the engine assembly, done so as to press one of said two entities (said fuselage lateral extension and said connection box) into contact with the other entity and below it, and then mounting said second attachment means between these two entities.

As mentioned above, the lifting step is preferably done using a lifting tool fitted on the fuselage lateral extension so that the engine assembly is displaced vertically until it is pressed into contact with this extension.

Other advantages and characteristics of the invention will become clear after reading the detailed non-limitative description given below.

This description will be made with reference to the appended drawings wherein.

Figure 1:
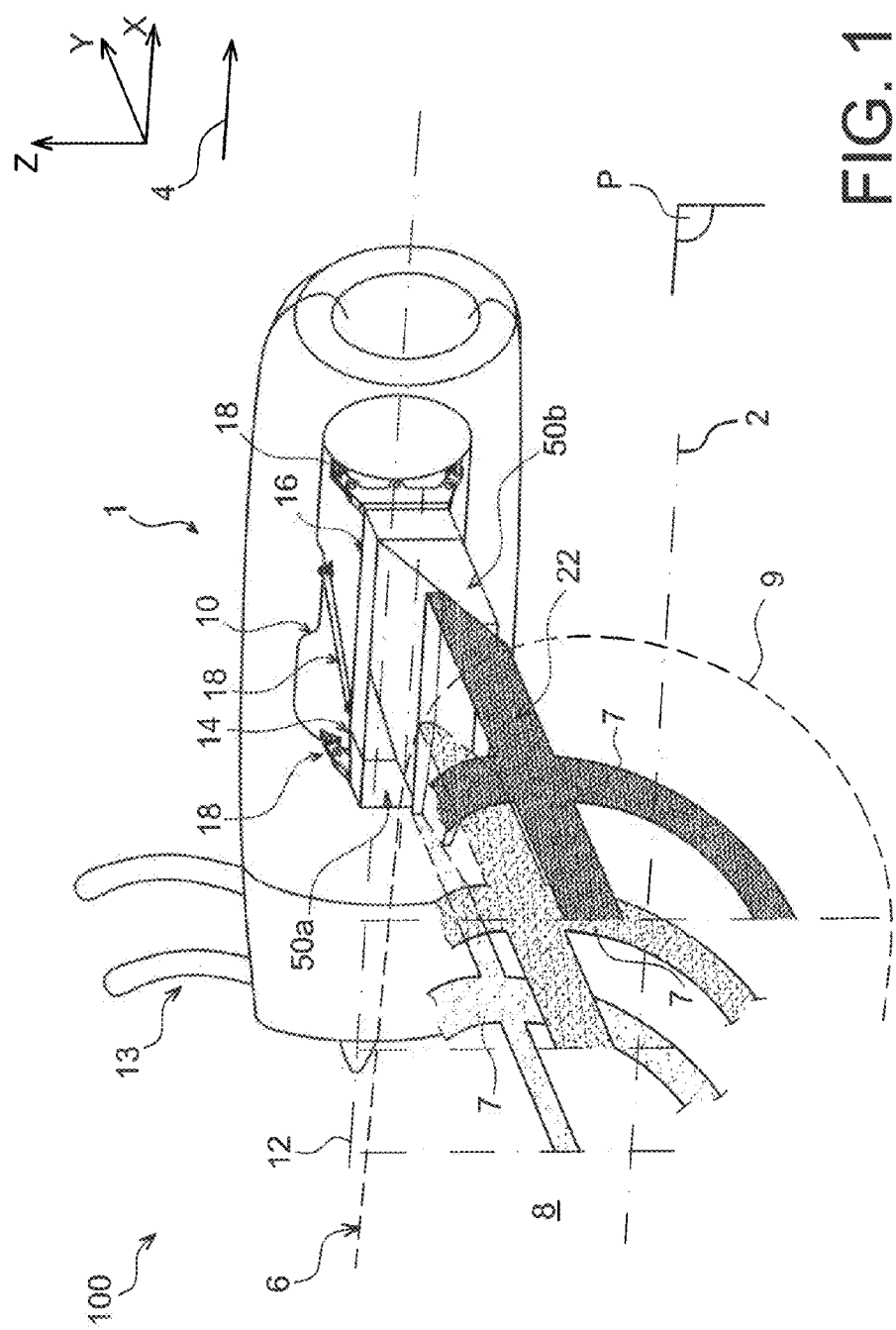
FIG. 1 shows a perspective diagrammatic view of an aft part of the aircraft according to a preferred embodiment of this invention.

With reference to FIG. 1, the figure shows an aft part 100 of an aircraft integrating an engine assembly 1, this aft part 100 being in the form of a first preferred embodiment of this invention.

Throughout the remaining description, by convention, X is the longitudinal direction of the aircraft that is parallel to a longitudinal axis 2 of this aircraft. Y is the direction transverse to the aircraft and Z is the vertical or height direction, these three directions X, Y and Z being orthogonal to each other.

The terms "forward" and "aft" should be considered with respect to a direction of movement of the aircraft as a result of the thrust applied by the engines, this direction being shown diagrammatically by the arrow 4.

Globally, the aft part 100 comprises a fuselage 6, of which a portion of the left part has been shown schematically, with a plurality of fuselage frames 7 at a spacing from each other along the X direction, and with an outer fuselage skin 9 forming an aerodynamic surface forming the external air flow path.

The cross-section of this fuselage is approximately circular, elliptical or a similar shape, with its centre passing through the longitudinal axis 2 and delimiting an aircraft inner space 8.

It also comprises two engine assemblies 1 (only one being represented) arranged on each side of a vertical median plane P passing through the axis 2. In the preferred embodiment, each assembly 1 comprises a turbine engine 10 of any type (turbojet, turboprop or other), in this case represented with the housing 13 in the aft part. Each has a longitudinal axis 12 approximately parallel to the X direction. The engine assembly 1 is also arranged at the side of the fuselage 6, it being specified that there may be an angle between the median horizontal plane of the aircraft and the plane passing through the longitudinal axes 2, 12 of the turbine engine and the aircraft, as will be described later with reference to FIG. 2. Typically, this angle may be between 10 and 35°. In any case, the engine assembly 1 is assumed to be added onto the side of the aircraft, and more precisely on an aft part of it, namely on a lateral extension 22 of it, preferably in the form of a box behind the main wing.

A mounting pylon 14 is provided for suspension of the turbine engine 10, comprising a rigid structure 16 also called the primary structure through which forces are resisted, the rigid structure 16 being conventionally clad by aerodynamic fairing (not shown) also called secondary structures.

The pylon 14 is provided with first attachment means inserted between the turbine engine 10 and the rigid structure 16, these first means with a conventional design known to those skilled in the art, being shown as reference 18 in FIG. 1. Furthermore, the pylon 14 has second attachment means (not shown) inserted between the turbine engine 10 and the aircraft structure, and more particularly inserted preferably entirely between the rigid structure 16 and the fuselage lateral extension 22 as will be described later.

Figure 2:
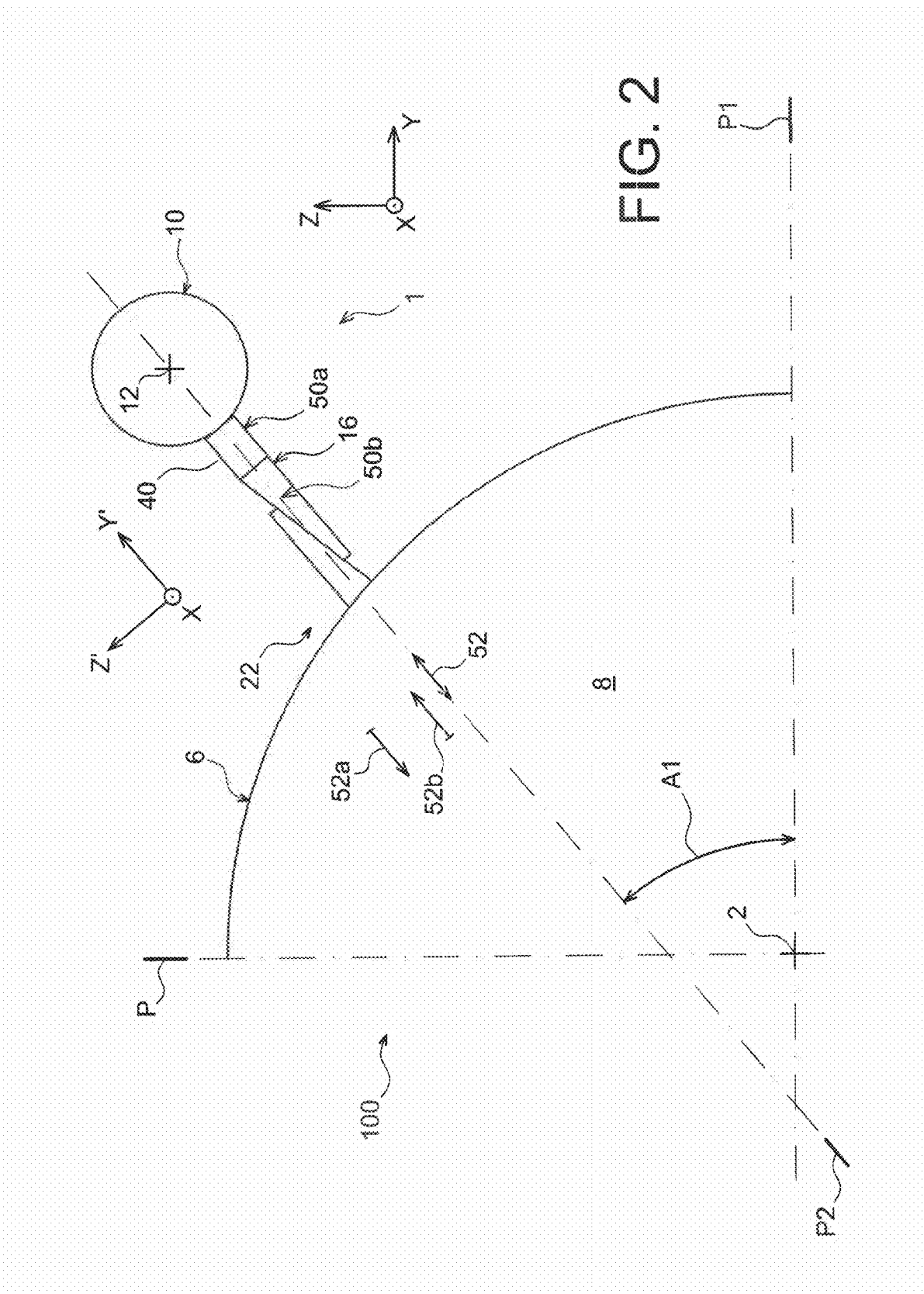
FIG. 2 shows a partial diagrammatic cross-sectional view of the aft part of the aircraft shown in FIG. 1.

FIG. 2 shows that the rigid structure 16 comprises at least one box 50a, 50b offset radially relative to the axis 12 of the engine, along a separation direction reference 52, also corresponding to the direction of separation between the aircraft fuselage and this turbojet 10, or also to the direction of the width of said box 50a, 50b.

For information, the direction of separation 52 is not necessarily parallel to or coincident with a median horizontal plane P1 of the aircraft, there may be an angle A1 between this horizontal median plane P1 and the direction of separation 52, as can be seen in FIG. 2. As can be seen in this figure, in cross-section, the inclined plane P2 containing the direction of separation 52 and forming the angle A1 may be distinct from the above mentioned plane passing through the longitudinal axes 2, 12 of the turbine engine and the aircraft, nevertheless the value of the angle A1 preferably remaining between 10 and 35°, and even more preferably being of the order of 24°.

In this respect, a new coordinate system attached to the engine assembly 1 and defined by the X, Y' and Z' directions, will be used for the remainder of the description. The X direction always corresponds to the longitudinal direction of the aircraft and the turbine engine, while the Y' direction located in a YZ plane corresponds to the direction of separation 52. Finally, the Z' direction also arranged in a YZ plane is orthogonal to the two directions X and Y' and is therefore orthogonal to the above-mentioned plane P2, which can be considered as a median plane in the thickness of the rigid structure 16.

Figure 3:
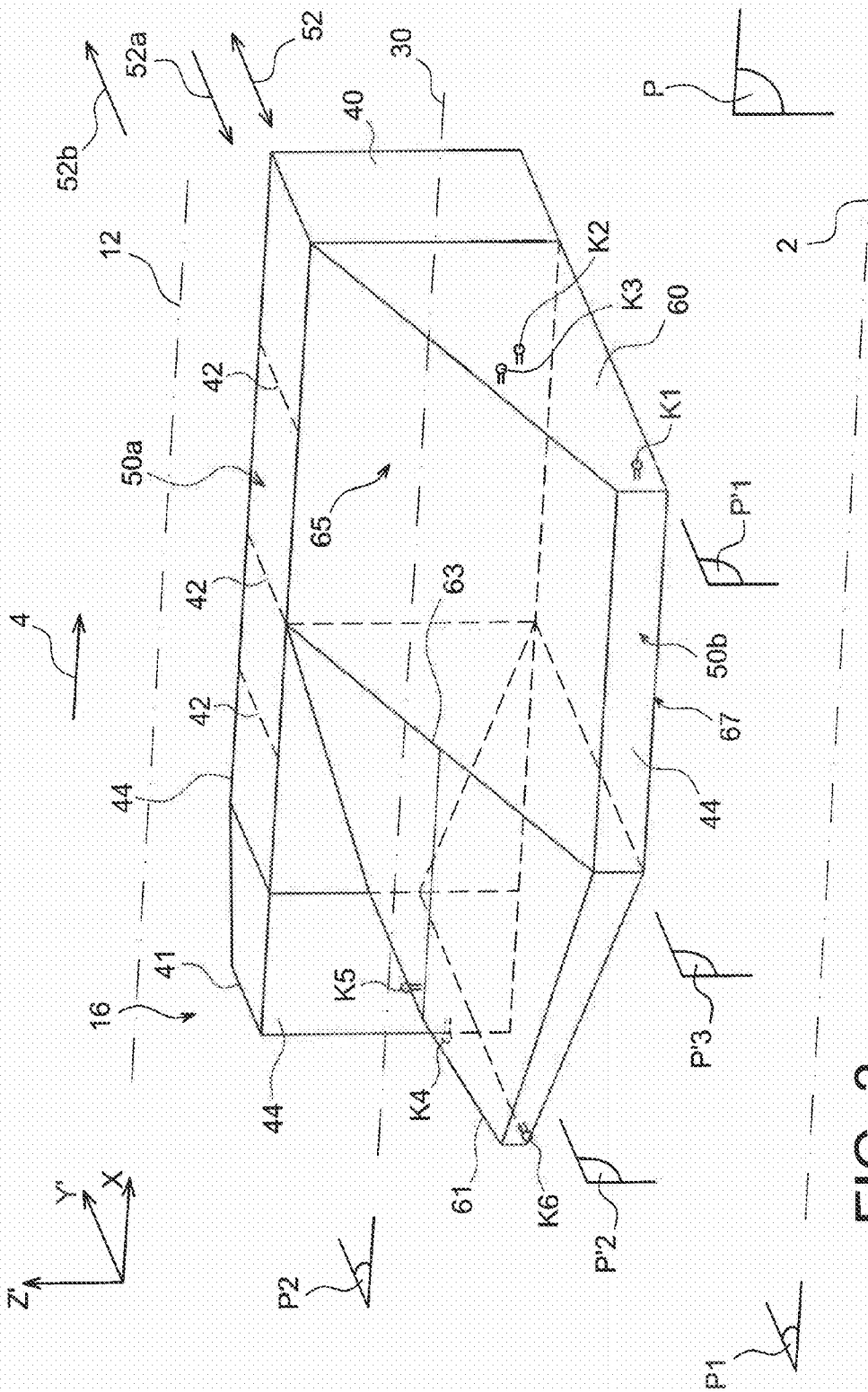
FIG. 3 shows a partial perspective view of the rigid structure of the mounting pylon belonging to the engine assembly shown in FIGS. 1 and 2.

FIG. 3 shows the rigid structure 16, therefore comprising a longitudinal central box 50a extending along a main direction 30 of the pylon that can be considered to be its longitudinal direction parallel to the X direction. The box 50a may have a forward closing rib 40 and an aft closing rib 41, and possible side closing panels 44 and inner stiffener ribs 42. An upper skin and a lower skin are also provided, approximately in XY' planes. The box 50a will preferably entirely comprise first attachment means connecting the rigid structure of the pylon to the turbine engine.

The rigid structure 16 comprises a connection box 50b supported by the longitudinal central box 50a and projecting from it along a first direction 52a along the line of separation 52, from the turbine engine towards the rigid structure 16. Obviously, this first direction 52a is opposite to a second direction 52b along this line 52. Here again, the box 50b extends along the main direction 30 of the pylon that can be considered as its longitudinal direction, and is provided with a plurality of ribs called second ribs, among which there is a forward closing rib 60 and an aft closing rib 61, and preferably an inner reinforcing rib 63. These three second ribs 60, 61, 63 are at a spacing from each other along the X direction, and each is located in a Y'Z' plane. As shown diagrammatically in FIG. 3, the first ribs 60, 61, 63 are arranged in planes references P'1, P'2, P'3 respectively.

Furthermore, box 50b comprises side closing panels 44. A single panel 44 may simultaneously close off the two boxes 50a, 50b. An upper skin 65 and a lower skin 67 are also provided approximately in XY' planes, or in planes slightly inclined relative to the XY' planes, along the X direction. The skins may be made, at least partly, in a single piece with the skins of the box 50a. Nevertheless, the thickness of the connection box 50b preferably becomes lower towards the aft direction and towards the axis 2 of the aircraft, as can be seen in FIG. 3.

On the other hand, the length of the connection box 50b along the X direction is less than the length of the central box 50a, which becomes close to the housing in which the turbine engine will be fitted (not shown). The two forward closing ribs 40 and 60 are preferably made from a single piece arranged in a Y'Z' plane, therefore only the aft closing ribs of the boxes 50a, 50b are at a spacing from each other along the direction 30.

In this first preferred embodiment, the second attachment means are entirely brought together on the connection box 50b. This is done by providing six assembly points, each of which will form an integral part of one of the six mounts making up the second attachment means forming a statically determinate mounting system. Therefore FIG. 3 shows the first three attachment points K1, K2, K3 fixed to the forward closing rib 60, projecting forwards, and the three other attachment points K4 fixed to the aft closing rib 61, projecting towards the aft direction, K5 fixed to the skin of the upper box 50b projecting upwards in the Z' direction, and finally K6 fixed to the side panel 44 facing the fuselage, projecting towards it along the Y' direction. Nevertheless, note that points K5 and K6 are arranged very close to the aft rib 61, so that the six mounts are located in two distinct zones at a distance from each other, centred on the forward closing rib 60 and the aft closing rib 61 respectively of the box 50b.

Figure 4:
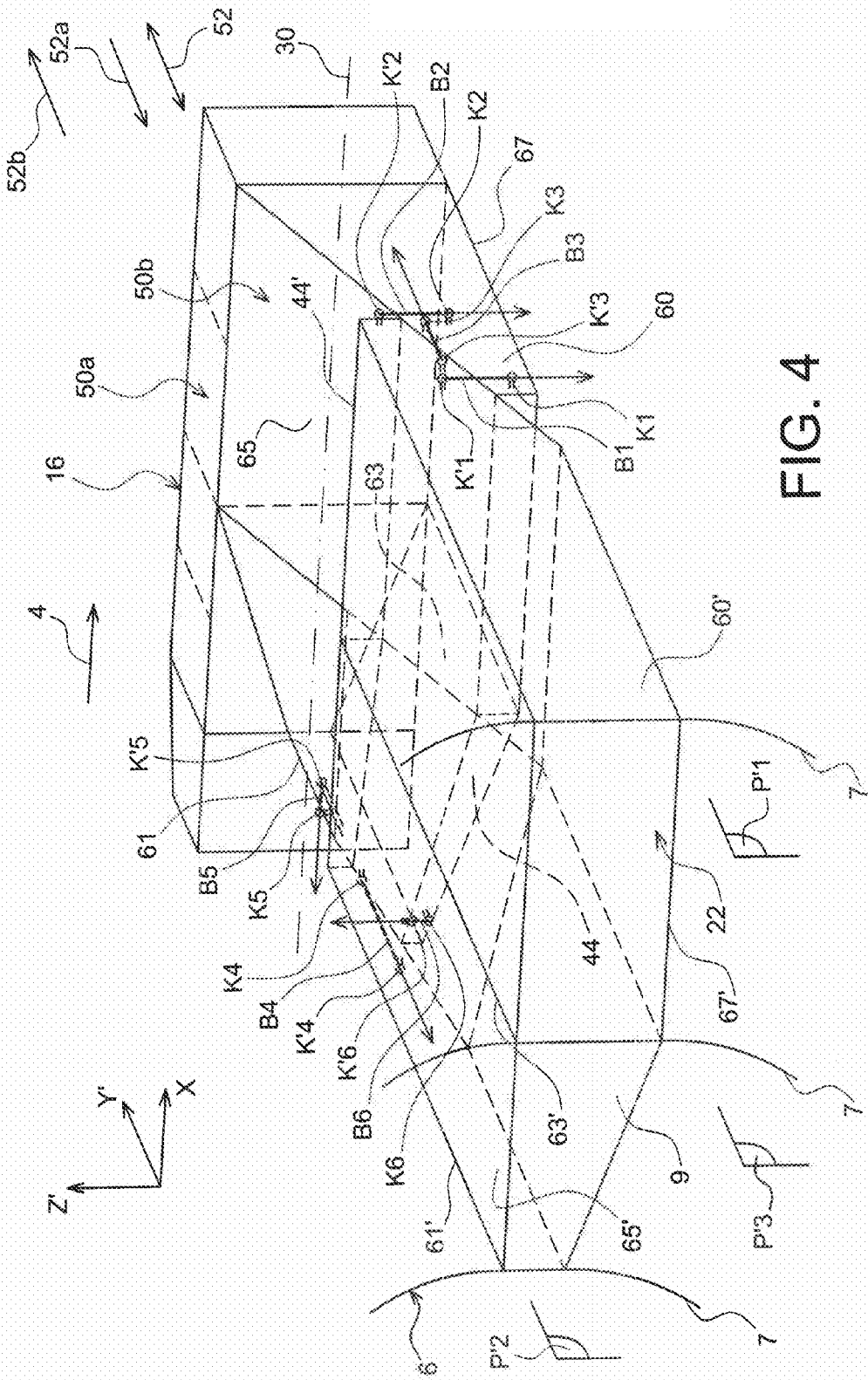
FIG. 4 shows a view similar to that in FIG. 3 on which the fuselage lateral extension is shown mounted on the rigid structure of the mounting pylon.

FIG. 4 shows the fuselage lateral extension 22 in the form of a box, installed on the connection box 50b, pressed into contact with this extension and below it. It extends along the second direction 52b along the line of separation 52, starting from the outer fuselage skin 9.

Once again, the extension 22 extends parallel to the principal direction 30 of the pylon, and it is provided with a plurality of ribs, called first ribs, including a forward closing rib 60' arranged above the rib 60 and continuous with it, namely in plane P'1. It also comprises an aft closing rib 61', arranged above the rib 61 and continuous with it, namely in plane P'2. Finally, it also comprises an inner reinforcing rib 63' arranged above the rib 63 and continuous with it, namely in plane P'3. Therefore, these first three ribs 60', 61', 63' are also at a spacing from each other along the X direction, and each is arranged in a Y'Z' plane.

The extension 22 also comprises lateral closing panels 44', one facing the box 50a of the rigid structure and preferably at a distance from it, and the other preferably composed of the fuselage outer skin 9, although this is obviously not necessary.

An upper skin 65' and a lower skin 67' are also provided approximately in XY' planes, or in planes slightly inclined relative to them along the X direction. Preferably, the surface of the upper skin 65 of the box 50b is in contact with the lower skin 67' of the extension 22 against which it is pressed, either in a single plane or multi-plane.

Note that the assembly process may be implemented using a lifting tool (not shown) installed directly on the fuselage extension, assuring solely vertical displacement of the engine assembly located below, until the upper skin 65 of its box 50b is pressed in contact with the lower skin 67' of the extension 22.

The thickness of the extension 22 may reduce in the aft direction and towards the centre line of the turbine engine as can be seen in FIG. 4. Thus, the two slender parts of the entities 22, 50b, corresponding to their free ends in the direction of separation, are pressed in contact to minimise the size at their superposition zone.

The length of extension 22 along the X direction is approximately identical to the length of the connection box 50b. Furthermore, these two entities superposed along the Z' direction have exactly the same shape globally, making the design perfectly homogeneous.

In this first preferred embodiment, the second attachment means are entirely added onto the extension 22. This is done by providing six assembly points, each designed to form an integral part of one of the six mounts making the second attachment means forming a statically determinate mounting system, and cooperating with points K1 to K6 arranged on box 50b.

Therefore, FIG. 4 shows the first three attachment points K'1, K'2, K'3 fixed to the forward closing rib 60' and projecting forwards, and the other three attachment points, K'4 fixed to the aft closing rib 61' projecting in the aft direction, K'5 fixed to the side panel 44' facing box 50a, projecting towards it along the Y' direction, and finally K'6 fixed to the lower skin 67', projecting downwards along the Z' direction. Once again, note that the points K'5 and K'6 are arranged to be very close to the aft rib 61', so that the six mounts can be located in two distinct zones at a distance from each other, centred on the forward closing rib 60' and the aft closing rib 61' respectively of box 50b.

The above mentioned mounting points of the extension 22 and the box 50b are connected in pairs through load resisting rods in order to form mounts forming the statically determinate attachment system. Thus, the first attachment includes a rod B1 oriented along the Z' direction and mounted on points K1, K'1, the second attachment includes a rod B2 oriented along the Z' direction and mounted on points K2, K'2, the third attachment includes a rod B3 oriented along the Y' direction and mounted on points K3, K'3, the fourth attachment includes a rod B4 oriented along the Y' direction and mounted on points K4, K'4, the fifth attachment includes a rod B5 oriented along the X direction and mounted on points K5, K'5, the sixth mount includes a rod B6 oriented along the Z' direction and mounted on points K6, K'6.

With this configuration, forces applied along the X direction are resisted by the fifth mount, and forces applied along the Y' direction are resisted by the second and fourth mounts, and forces applied along the Z' direction are resisted by the first, third and sixth mounts. Furthermore, the moment applied along the Y' direction is resisted jointly by the first, third and sixth mounts, the moment applied along the Z' direction is resisted jointly by the second and fourth mounts, and the moment applied along the X direction is resisted jointly by the first and third mounts.

If the forward and aft closing ribs 60, 60', 61, 61', and their proximity make it possible to house the six above-mentioned mounts, the two inner ribs 63, 63' may house waiting mounts (not shown) called "Fail Safe" mounts, in other words that will participate in resisting forces only in the case of a failure of one or several of the six main mounts.

Figure 5:
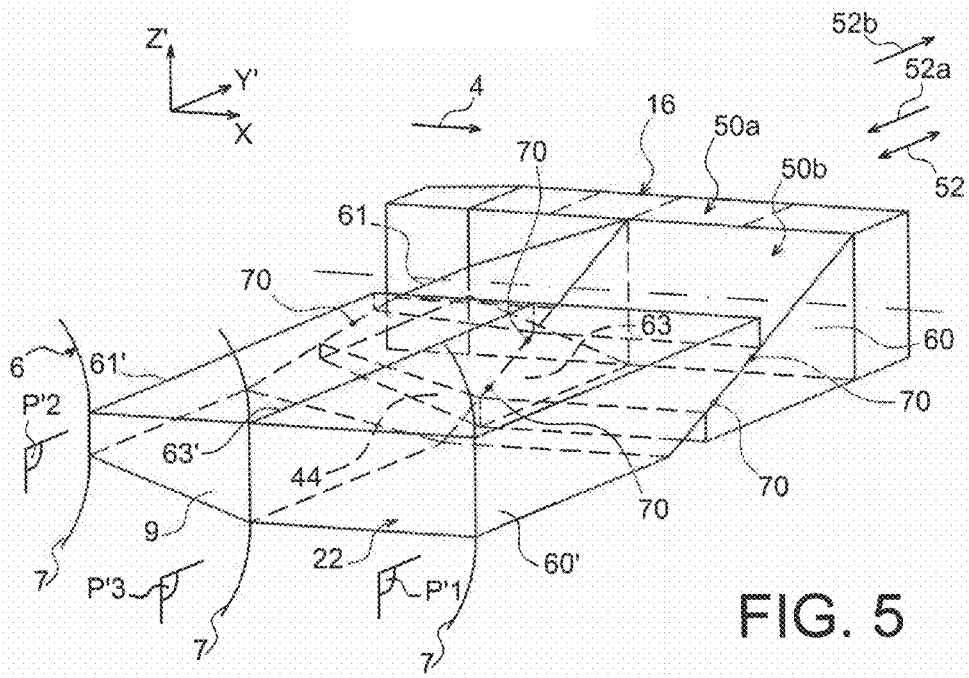
FIG. 5 shows a view similar to that in FIG. 4, with an aft part presented in the form of a second preferred embodiment of this invention.

FIG. 5 shows a second preferred embodiment of this invention. Instead of a statically determinate system, the second attachment means form a statically indeterminate attachment system between the rigid structure 16 and the fuselage extension 22, the design of these two entities being exactly the same or similar to that described above.

In order to maintain the statically indeterminate system, there may be five or six soft mounts 70 preferably arranged between the first and second ribs. In the configuration show in the example, two mounts 70 are provided in the plane P'1 at the interface between the two forward closing ribs 60, 60', two mounts 70 are provided in the plane P'3 at the interface between the two inner ribs 63, 63', and a mount 70 is provided in the plane P'2 at the interface between the two aft closing ribs 61, 61'.

Figure 6:
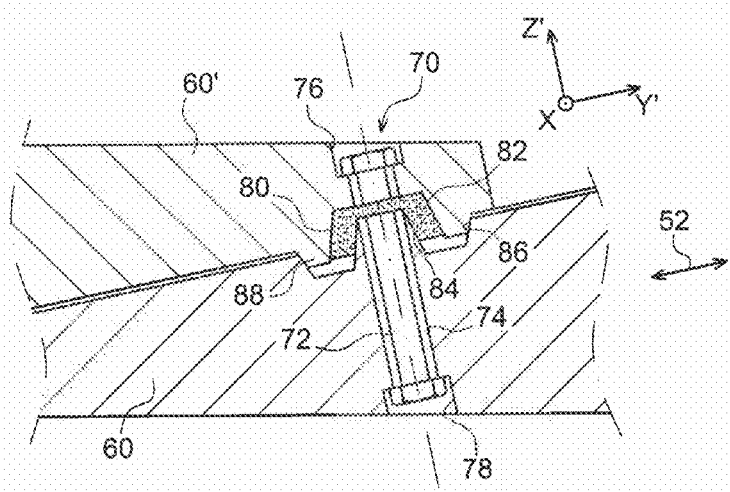
FIG. 6 shows a front view of one of the soft mounts belonging to the second attachment means diagrammatically shown in FIG. 5.

FIG. 5 shows these soft mounts 70 only diagrammatically, and a preferred design is shown in detail in FIG. 6. The mount comprises a tie rod type system with two concentric axes 72, 74, one with its top end supported in a housing 76 formed on the upper part of the rib 60', and the other with its top end supported in a housing 78 formed on the lower part of the rib 60. Thus, the tie rod passes through the two ribs to press one into contact with the other, along the Z' direction preferably also corresponding to the direction of the tie rod. The tie rod may be tensioned using a hydraulic jack to facilitate installation.

The first rib 60' is provided with a housing 80 at the interface between the two ribs, into which a rubber or elastomer conical damping ring 82 is fitted, this housing being in contact with the outer surface of this ring. A conical pin 84 is provided on the second rib 60, matching the inner surface of the ring 82, squeezing it between elements 80, 84 to improve damping of vibrations. A groove 86 may also be formed in the second rib 60 around the pin 84, to form a centering device in which a matching form 88 is inserted belonging to the rib 60' and preferably arranged to prolong the housing 80. Note that in order to make such an assembly, the box skins may be trimmed locally in order to enable passage of the tie rod and placement of the damping ring 82.

Figure 7:
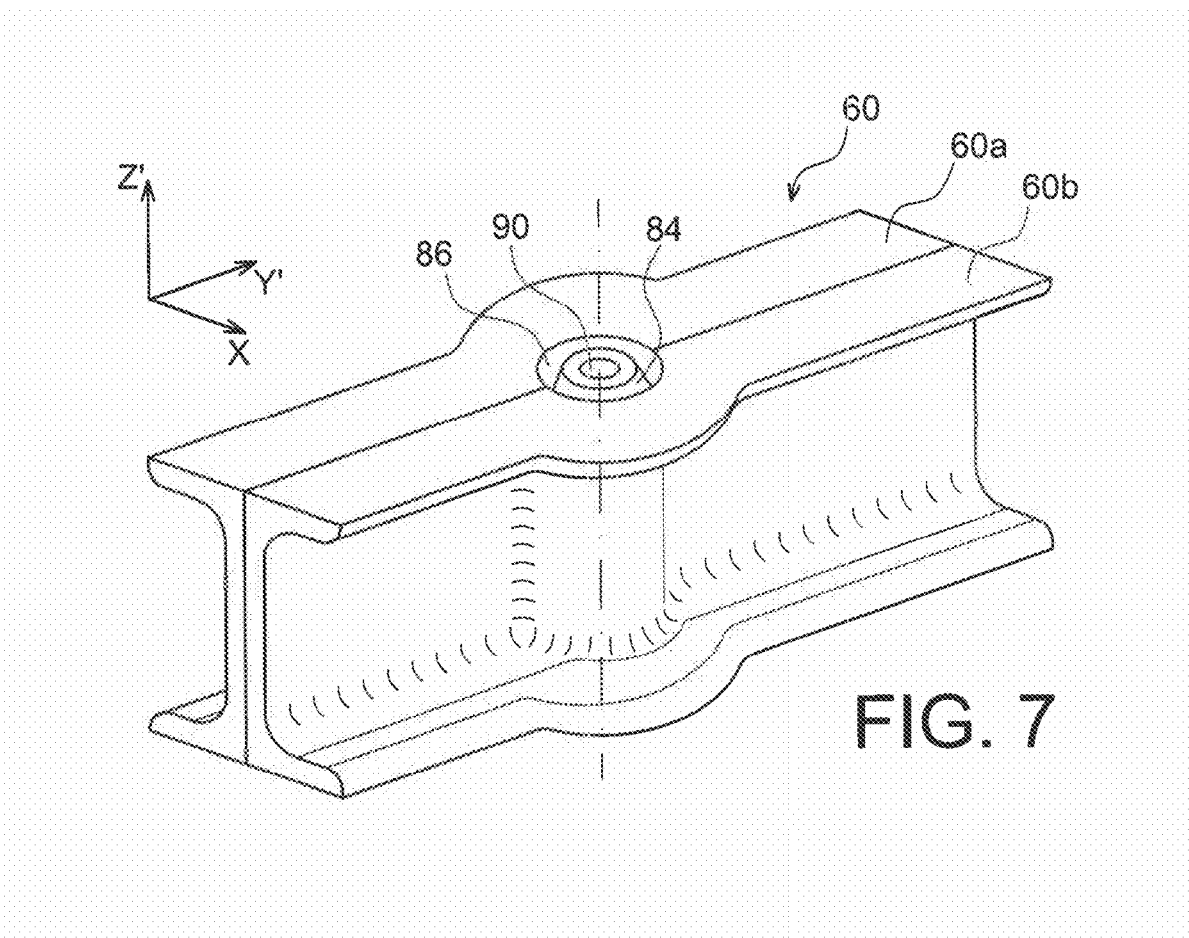
FIG. 7 shows a perspective view of one possible embodiment for the rib of the mounting pylon shown in FIG. 6.

Finally, FIG. 7 shows a possible embodiment for the second forward closing rib 60 applicable to all second ribs of the connection box. In this embodiment, the rib 60 is made from two superposed elements 60a, 60b superposed along the X direction and jointly forming the orifice 90 through which the tie rod system described above will pass. Therefore each of the two elements 60a, 60b forms half of the orifice 90 and half of the pin 84 and half of the centering groove 86, the centre line of the tie rod and of the orifice 90 being arranged in the interface plane of the two elements 60a, 60b. This enables a standby/safety "Fail Safe" function, because if one of the two component elements 60a, 60b of the rib 60 breaks, the other continues to transmit forces.

An identical or similar design may obviously be adopted for the first ribs 60', 61', 63' of the fuselage extension 22.

Obviously, those skilled in the art could make various modifications to the invention that is described above only as non-limitative examples. For example, the lateral fuselage extension 22 could alternately be pressed into contact under the connection box 50b, without going outside the scope of the invention.

The invention claimed is:

1. An aft part of an aircraft comprising:
   at least one engine assembly including a turbine engine and a turbine engine mounting pylon, the engine assembly being added onto a side of an aircraft structure;
   the pylon comprising a rigid structure offset radially from a longitudinal axis of the turbine engine along one direction of separation, and first attachment means for assembly of the turbine engine on the rigid structure and second attachment means fixed firstly to the rigid structure and secondly to the aircraft structure;
   the rigid structure comprising a longitudinal central box and a connection box carried by the central longitudinal box and projecting from it along a first direction of a line of separation from the turbine engine towards the rigid structure; and
   the aircraft structure comprising a fuselage lateral extension projecting from the fuselage in a second direction along the line of separation, opposite the first direction, wherein one of the two entities among the lateral extension of the fuselage and the connection box is pressed into contact with the other entity, below it, the second attachment means being arranged between these two entities.

2. An aircraft comprising an aft part according to claim 1.

3. A method of assembly an aft part of an aircraft according to claim 1, comprising:
   lifting the engine assembly, so as to press one of the two entities into contact among the fuselage lateral extension and the connection box into contact with the other entity and below it; and
   then mounting the second attachments means between the two entities.

4. An aft part according to claim 1, wherein
   the fuselage lateral extension comprises a plurality of first ribs;
   the connection box comprises a plurality of second ribs; and
   at least one of the first ribs is laid out in continuity of one of the second ribs, approximately in a same plane.

5. An aft part according to claim 4, wherein at least part of the second attachment means is fixed on the first and second ribs.

6. An aft part according to claim 4, wherein each first rib of the fuselage lateral extension is made in a single piece with a fuselage frame.

7. An aft part according to claim 1, wherein the second attachment means forms a statically determinate attachment system of the engine assembly onto the aircraft structure.

8. An aft part according to claim 7, wherein the second attachment means includes a plurality of mounts each including a rod resisting forces.

9. An aft part according to claim 1, wherein the second attachment means forms a statically indeterminate system for attachment of the engine assembly onto the aircraft structure.

10. An aft part according to claim 9, wherein the second attachment means includes a plurality of soft mounts each including a shock absorbing element made of rubber or elastomer.

* * * * *